June 14, 1932.  J. F. O'CONNOR  1,862,766
FRICTION SHOCK ABSORBING MECHANISM
Filed Feb. 15, 1929
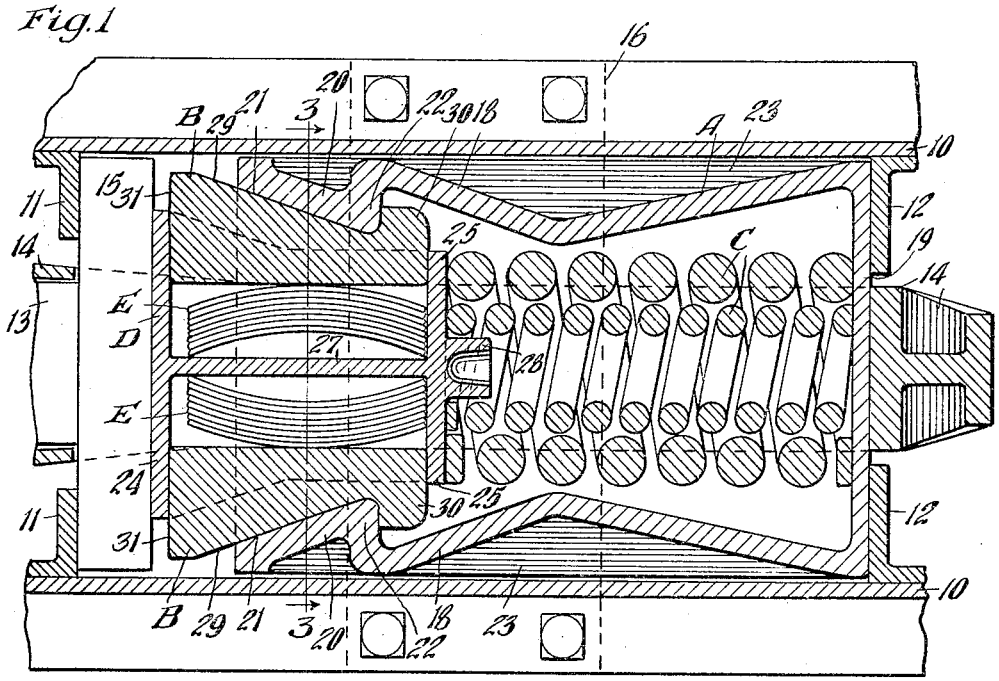
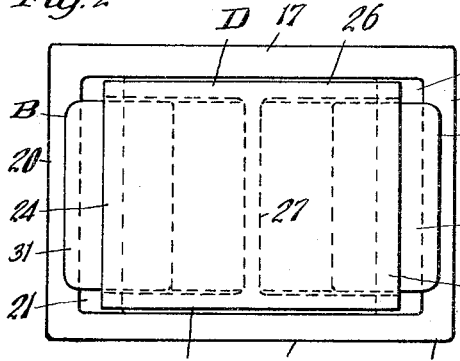
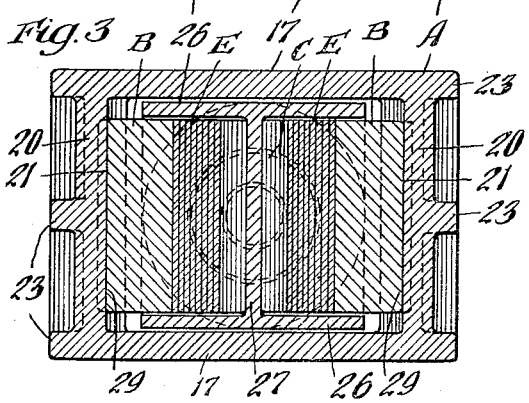
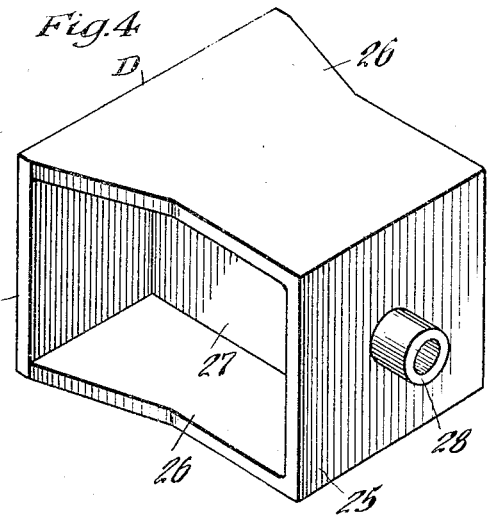
Witness
Wm. Geiger
Inventor
John F. O'Connor
By Joseph Harris
His Atty.

Patented June 14, 1932

1,862,766

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed February 15, 1929. Serial No. 340,266.

This invention relates to improvements in friction shock absorbing mechanisms.

One object of the invention is to provide a friction shock absorbing mechanism including a casing open at one end and a main follower at the open end of the casing, the casing and follower being relatively movable toward and away from each other, the casing having opposed interior, inwardly converging friction wedge surfaces at opposite sides thereof; friction wedge blocks movable inwardly of the casing with said follower; laminated plate spring means opposing lateral approach of the blocks, the laminated plate spring means comprising a plurality of longitudinally disposed spring plates; a carrier for the plates, having a transverse front wall interposed between the follower and the front ends of the plates and engageable with the outer ends of the blocks, the front wall of the carrier protecting and shielding the front follower against damage by the raw front end edges of the spring plates by preventing engagement of the plates with the follower, and thus eliminating any tendency to displace the follower laterally or vertically through the flexing action of the spring plates; and a main spring resistance within the casing opposing inward movement of the carrier.

A further object of the invention is to provide a friction shock absorbing mechanism including a casing having inwardly converging friction wedge surfaces at opposite sides thereof; a main follower; a pair of wedge friction blocks movable lengthwise of the casing and cooperating with the friction wedge surfaces thereof; plate spring means opposing relative approach of the wedge friction blocks in a lateral direction; and yielding means opposing inward movement of the blocks, wherein the follower is protected from damage by the raw end edges of the spring plates and all danger of lateral or vertical displacement of the follower through the lever action of the flexing plates is eliminated by employment of a carrier enclosing the plate springs, the carrier having a central partition wall for separating the plate springs and a front end wall directly engaging the main follower and interposed between the same and the front raw end edges of the spring plates, and a rear wall, the front and rear walls together forming a transverse guideway between which the wedge friction blocks are guided for transverse movement.

Other and further objects of the invention will more clearly appear from the description and claims hereinafter following.

In the drawing forming a part of this specification, Figure 1 is a horizontal, longitudinal sectional view through the underframe structure of a railway car, illustrating my improvements in connection therewith. Figure 2 is a front end elevational view of the shock absorbing mechanism proper, illustrated in Figure 1. Figure 3 is a vertical, transverse sectional view, corresponding substantially to the line 3—3 of Figure 1. And Figure 4 is a detailed perspective view of a carrier member employed in connection with my improved friction shock absorbing mechanism.

In said drawing, 10—10 indicate spaced channel-shaped center or draft sills of a railway car having the usual front stop lugs 11—11 and rear stop lugs 12—12 secured to the inner sides thereof. The inner end portion of the coupler shank is designated by 13 and a hooded yoke 14 of well known form is operatively connected to the coupler shank. My improved shock absorbing mechanism proper and a front main follower 15 are disposed within the yoke and the yoke in turn is supported in operative position by a detachable saddle plate 16 secured to the draft sills.

My improved shock absorbing mechanism comprises, broadly, a casing A, two friction wedge blocks B—B, a main spring resistance C, a carrier D, and two laminated plate springs E—E.

The casing A is in the form of a box-like member having horizontally disposed, spaced top and bottom walls 17—17, spaced side walls 18—18, and a tranverse rear end wall 19. The end wall 19 cooperates with the stop lugs 12 in the manner of the usual rear follower. As most clearly illustrated in Figure 1, the side walls have relatively short, inwardly converging sections 20—20 at the front ends thereof, which present interior friction wedge faces 21—21. Rearwardly of the friction wedge surfaces 21—21, transverse retaining shoulders 22—22 are provided, and the side wall sections immediately to the rear of these shoulders converge inwardly, as shown. The rear end portions of the side walls diverge rearwardly and the side walls are reinforced by longitudinally extending webs 23—23, most clearly shown in Figures 1 and 3.

The carrier D has transversely extending vertical front and rear end walls 24 and 25, spaced horizontal top and bottom walls 26—26, and a longitudinally extending vertical central partition wall 27. The partition wall 27 divides the carrier into two pockets or compartments. The front end wall 24 of the carrier bears directly on the inner surface of the main follower 15. At the inner end, the carrier is provided with a rearwardly extending boss 28 adapted to cooperate with the main spring resistance to maintain the parts in centered relation.

The main spring resistance comprises inner and outer coils having their rear ends bearing directly on the end wall 19 of the casing and the front ends in engagement with the end wall 25 of the casing D, the centering lug 28 projecting within the coil of the inner spring.

The friction wedge blocks B are of similar design and are disposed at opposite sides of the mechanism and cooperate with the friction wedge surfaces 21—21 of the casing. Each block has an outer friction wedge surface 29 inclined to the longitudinal axis of the mechanism to correspond with the inclination of the friction wedge surface 21 at the corresponding side of the casing. The friction wedge surface 29 of each block B engages the corresponding friction surface of the casing. At the inner end of the friction wedge surface 29, each block is provided with a retaining shoulder 30 which engages in back of the shoulder 22 at the corresponding side of the casing, thereby limiting the outward movement of the block B.

As most clearly illustrated in Figures 1 and 3, the blocks B are of such a height and length as to fit within the pockets of the carrier D, each block being provided with a flat front end face 31 which bears directly on the inner side of the front end wall 24 of the carrier. At the inner end, each block is also provided with a flat end face which cooperates with the rear end wall 25 of the carrier. As shown in Figure 3, the blocks B loosely fit between the top and bottom walls of the carrier so that the same may slide laterally inwardly of the carrier.

The laminated plate springs E, which are two in number, are arranged at opposite sides of the partition wall 27 of the carrier D within the pockets of the same. Each spring comprises a plurality of rectangular spring plates which are curved lengthwise of the mechanism and arranged in nested relation with the convex surfaces arranged outwardly and the outermost spring plate of each set bearing directly on the inner side of the corresponding friction wedge block B. The spring plates, when in their curved condition, are of lesser length than the pockets of the carrier, thus providing clearance to allow straightening of the plates when compressed laterally.

In the normal full release position of the parts shown in the drawing, outward movement of the blocks B is limited by shouldered engagement with the transverse abutment faces 22 of the casing and outward movement of the carrier D is limited by engagement of the inner end wall 25 thereof with the inner ends of the blocks B. All the parts of the mechanism are thus held in assembled relation and of uniform over-all length. When the parts are assembled, the main spring resistance C, as well as the laminated plate springs E, are preferably placed under a certain amount of initial compression.

The operation of my improved shock absorbing mechanism is as follows: During either a buffing or draft action, the main follower 15 and the casing A will be moved relatively toward each other and the carrier D will be forced inwardly of the casing against the resistance of the main spring C. Due to the inward movement of the carrier, the wedge blocks B will be forced inwardly also along the converging friction wedge surfaces 21 of the casing. Due to the wedging action between the surfaces 29 of the blocks B and the surfaces 21 of the casing, the blocks will be forced laterally inwardly toward each other, thereby compressing the springs E against the partition wall 27 of the carrier. Inasmuch as the front end wall 24 of the carrier bears directly on the front end faces 31 of the blocks B, a certain amount of friction will be created between these surfaces during the lateral approach of the blocks. Relative approach of the main follower and casing will be limited by engagement of the follower with the front end of the casing, whereupon the actuating forces will be transmitted through these members directly to the stop lugs of the draft sills, thereby preventing undue compression of the springs of the shock absorbing mechanism.

As will be evident, the blocks B will be guided in a true lateral path with respect to the carrier D by the front and rear end walls thereof. In addition to serving as a friction member, the front end wall 24 also protects the main follower 15 from damage by the raw front end edges of the plate springs E. It is further pointed out that by preventing engagement of the follower and the spring plates, accidental vertical or lateral displacement of the main follower during the flexing of the plates is eliminated, it being pointed out that when the spring plates in a mechanism of the type illustrated are allowed to engage the main follower, the same, through their lever action, tend to displace the follower laterally and vertically, thereby bringing the parts of the shock absorbing mechanism out of alignment with resultant damage to the same and the underframe structure of the car.

During release of my improved shock absorbing mechanism, the expansive action of the spring resistance C will force the carrier D and the wedge blocks B outwardly, and the tendency of the laminated plate springs E to assume their curved condition will force the blocks B apart and hold the same in engagement with the surfaces 21 of the casing. As hereinbefore pointed out, outward movement of the parts is limited by engagement of the shoulders 30 of the shoes with the shoulders 22 of the casing, the carrier being limited in its outward movement by the inner end wall 25 which bears on the inner ends of the blocks B.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with a casing and a main follower, relatively movable toward and away from each other lengthwise of the mechanism, the casing having opposed interior, inwardly converging wedge friction surfaces; of a pair of wedge friction blocks having wedging engagement with the casing; laminated plate springs opposing lateral approach of the blocks; a carrier for the plate springs, the carrier having a transverse front end wall interposed between the main follower and the front ends of the spring plates; guide means for the wedge blocks including said front end wall and a cooperating rear wall on the carrier; and spring resistance means within the casing opposing inward movement of the carrier.

2. In a friction shock absorbing mechanism, the combination with a casing having interior, inwardly converging friction wedge surfaces; of a carrier slidingly supported within the casing and adapted to receive the actuating force, said carrier having a bottom wall and central, longitudinally disposed partition wall; a main spring resistance within the casing opposing inward movement of the carrier; friction wedge blocks supported on said bottom wall of the carrier; means on the carrier rigid therewith for guiding the blocks for lateral movement, said blocks being disposed at opposite sides of the mechanism and cooperating with the friction wedge surfaces of the casing; plate spring means interposed between the partition wall of the carrier and each friction wedge block, said plate spring means opposing lateral approach of the blocks.

3. In a friction shock absorbing mechanism, the combination with a casing and a main follower movable relatively toward and away from each other lengthwise of the mechanism; of a carrier having spaced front and rear end walls; top and bottom walls and a central partition wall extending lengthwise of the carrier and dividing the same into two compartments, said front end wall bearing directly on the main follower; a main spring resistance within the casing opposing inward movement of the carrier; a pair of friction wedge blocks at opposite sides of the mechanism guided between the front and rear end walls of the carrier, having frictional engagement with said front end wall and both wedging and frictional engagement with the friction wedge surface at the corresponding side of the casing; and plate spring means in the pockets of the carrier at opposite sides of the partition wall thereof and interposed between the same and the friction wedge blocks, the plates of said spring means extending lengthwise of the mechanism.

4. In a friction shock absorbing mechanism, the combination with a casing and a main follower relatively movable toward and away from each other, lengthwise of the mechanism, said casing having opposed interior, inwardly converging friction wedge surfaces on opposite sides thereof; of a carrier slidingly supported within the casing, said carrier having laterally opening pockets, said carrier directly engaging the main follower and being movable lengthwise of the casing; plate spring means in each pocket of the carrier, each plate spring means comprising a plurality of nested plates curved lengthwise of the mechanism, said plates in their curved condition being of lesser over-all length than the corresponding pocket to provide clearance for said plates when straightened out; a friction wedge block guided for lateral movement in each pocket, said blocks being interposed between the plate spring means and the converging side walls of the casing; and a main spring resistance within the casing yieldingly opposing inward movement of the carrier and friction wedge blocks.

5. In a friction shock absorbing mechanism, the combination with a main follower; of a casing having opposed interior, inwardly converging friction wedge surfaces; a pair of friction wedge blocks having wedging engagement with the wedge surfaces of the casing; a carrier telescoped within the casing and supporting said wedge blocks; a main spring resistance opposing inward movement of the carrier; guide means forming a part of the carrier rigid therewith for guiding the friction wedge blocks for movement transversely thereof, said guide means engaging the main follower; and plate spring means supported on the carrier interposed between the friction wedge blocks and yieldingly opposing relative lateral approach of the same.

In witness that I claim the foregoing I have hereunto subscribed my name this 13th day of February, 1929.

JOHN F. O'CONNOR.